Oct. 10, 1967 — H. ALLEN — 3,346,234
VALVE
Filed June 29, 1964
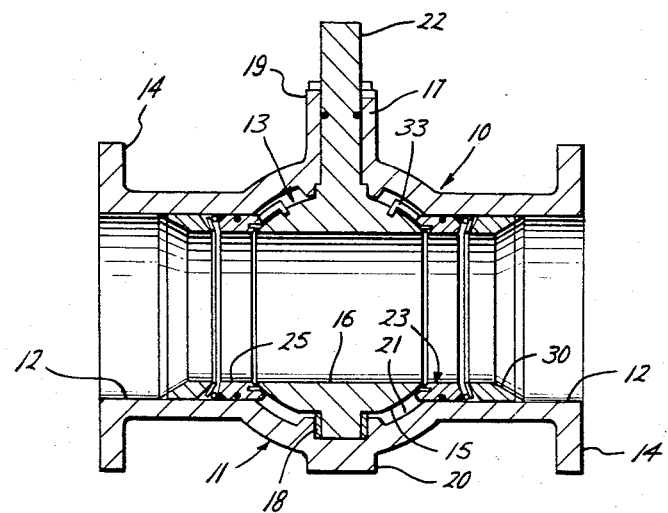
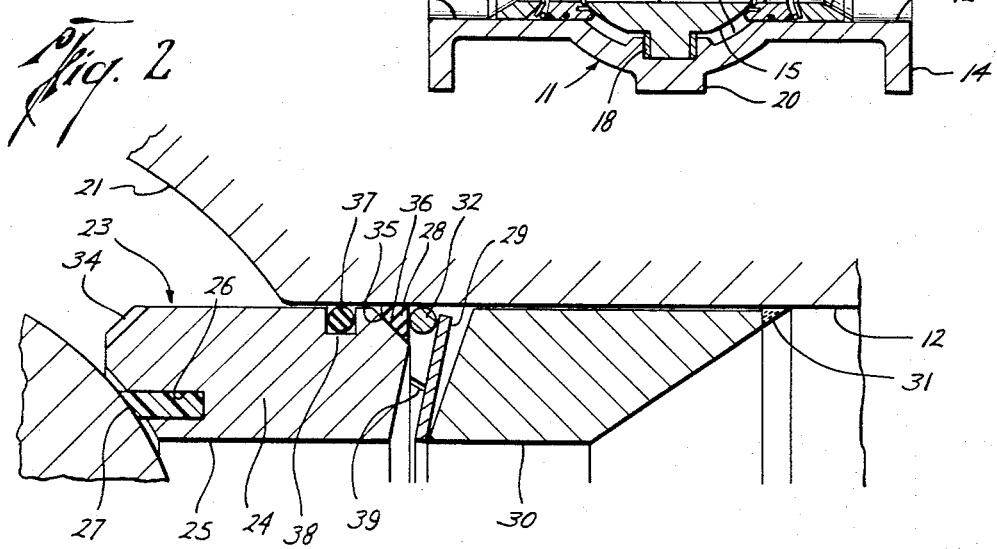
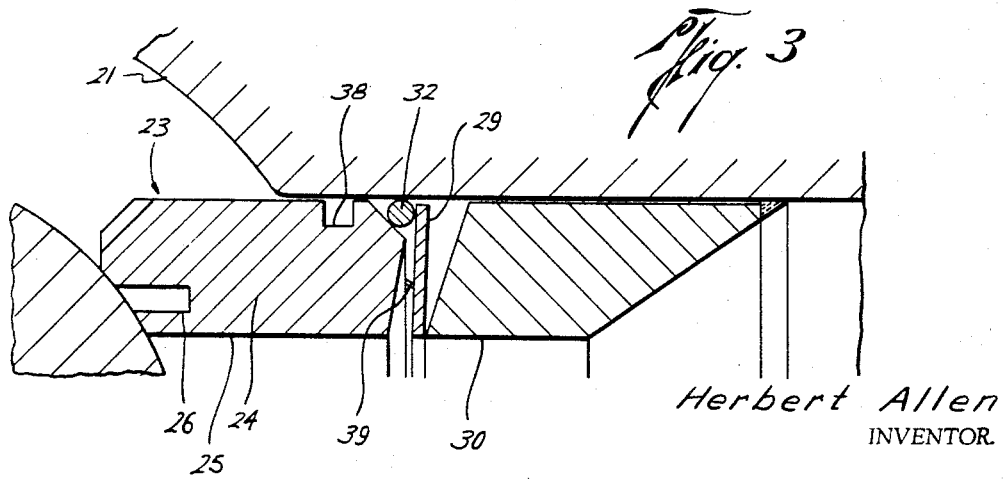
Herbert Allen
INVENTOR.
BY
ATTORNEYS

United States Patent Office 3,346,234
Patented Oct. 10, 1967

3,346,234
VALVE
Herbert Allen, Houston, Tex., assignor to Cameron Iron
Works, Inc., a corporation of Texas
Filed June 29, 1964, Ser. No. 378,842
1 Claim. (Cl. 251—174)

This invention relates generally to valves; and, more particularly, to improvements in valves having annular seats which are sealably slidable within the flowway through the valve body for engaging at their inner ends with one side of the valve member.

Generally, each such seat comprises a metal body which carries a ring of nonmetallic sealing material which protrudes from its inner end to seal against the valve member, and another nonmetallic ring about its outer circumference for sealing between it and the flowway in which the seat is slidable. In this manner, when the valve member is closed, line pressure may be contained by the two seal rings and caused to act over the area defined by the second described ring to urge the other ring tightly against the valve member.

Frequently, these seats are formed of rubber or a rubberlike material having similar elasticity. Recently, however, valve manufacturers have shown a preference for seal rings formed of "Teflon." Among other things this material has a very low coefficient of friction so that when used as a seal ring on the inner end of a valve seat, it facilitates sliding of the valve member therepast. Rotation of the seat so as to distribute wear thereabout is also facilitated when the seal ring about the outer circumference of the seat is also formed of this material. In both cases, it is desirable to preload the seal rings to about their yield point, and this may be accomplished by a spring bearing against a seal ring engaging about a shoulder on the outer end of the seat body.

When such nonmetallic materials are subjected to very high temperatures, as might occur in the event of a fire near the valve, they will disintegrate or, in any case, lose their sealing ability. This presents no particular problem insofar as the seal ring on the inner end of the seat is concerned, because even if the ring disintegrates, the inner end of the metallic seat body will move against the valve member to substantially close the space between them and thereby provide a so-called "fire seal." On the other hand, there is an annular clearance between the outer circumference of the seat body and the flowway so as to permit the seat body to slide without binding in the flowway. Even though this clearance is relatively small, the loss of the nonmetallic seal between these parts may result in a serious leak, and it is an object of this invention to provide such a valve in which this space is also substantially closed by a fire seal between the seat body and the flowway in the even the nonmetallic seal ring between them is destroyed.

Another object is to provide a valve of the type above described in which such fire seal cooperates with a spring in preloading a destructible seal ring of Teflon or the like so as to maintain it in sealing engagement between the seat body and flowway; and, more particularly, in which such fire seal also cooperates with the spring in preloading another seal ring on the inner end of the seat body into sealing engagement with the valve member.

A further object is to provide a valve having such a fire seal which requires only a minimum of parts over and above the usual valve parts; and, more particularly, which requires only a metal ring of simple construction.

A still further object is to provide a valve having a fire seal of the type above described which is so constructed and arranged that it will not increase the frictional resistance to rotation of the seat during normal operation of the valve prior to destruction of the nonmetallic seal.

In the drawings, wherein like reference characters are used throughout to designate like parts:

FIG. 1 is a longitudinal sectional view of a valve constructed in accordance with the present invention, and with the valve member thereof in a position opening the flowway through the valve body during its normal operation;

FIG. 2 is an enlarged sectional view of one of the valve seats shown in the valve FIG. 1, prior to destruction of the nonmetallic seal rings thereof and with the valve member moved to flowway closing position; and FIG. 3 is a sectional view similar to FIG. 2, but wherein the nonmetallic seal rings have been destroyed, and the annular space between the seat and the flowway through the valve body has been substantially closed by the above-mentioned fire seal.

With reference now to the details of the drawings, the valve shown in FIG. 1, and designated in its entirety by the reference character 10, comprises a valve body 11 having a flowway 12 therethrough and a valve member 13 moveable therein to open and close the flowway. The opposite ends of the valve body are provided with flanges 14 or other suitable means for connecting it in a pipeline.

The valve member 13 includes a spherically shaped closure 15 having an opening 16 therethrough and stems 17 and 18 on its upper and lower ends for rotation within bearings 19 and 20, respectively, on the body. More particularly, and as shown in FIG. 1, the intermediate portion of the flowway 12 is enlarged to provide a cavity 21 which fits relatively closely about the spherical closure 15. The outer end of the stem 17 extends from bearing 19 to provide a part 22 actuatable to rotate the valve member 13 between the open position of FIG. 1, wherein opening 16 is axially aligned with flowway 12, and the closed position shown in FIGS. 2 and 3, wherein solid portions of the closure 15 on opposite sides of the opening 16 are disposed across the flowway.

Each opposite side of the valve member is engaged by a seat 23 comprising a seat body 24 having an opening 25 therethrough of substantially the same inner diameter as the opening 16 through the valve member. The inner end of each seat body has an annular groove 26 thereabout which receives a ring 27 of nonmetallic sealing material. As previously described, and as shown in FIG. 2, the inner end of this seal ring protrudes from the seat body to engage the adjacent side of the valve member.

Another seal ring 28 of nonmetallic material surrounds the outer circumference of the seat body 24 for sealing between it and the flowway 12 through the valve body so as to close the annular clearance between the seat body and the flowway. Thus, in the closed position of the valve, seal rings 27 and 28 are sealably engaged against the valve member and the flowway, respectively, so that line pressure within the flowway is operable over a large area of the outer end of the seat body to urge the inner end of the seat body against the valve member.

As shown in FIG. 2, a washer type spring 29 is held between a tubular retainer 30 welded at 31 or otherwise secured in the flowway and a metallic ring 32 bearing against the outer side of the seal ring 28, such retainer having an opening 30a therethrough providing a continuation of closure opening 16. As will be described to follow, the metal ring 32 is operative to provide the "fire seal" between the seat and flowway when the seal ring 28 is destroyed. However, it is sufficient to note at this time that ring 32 transmits the force of spring 29 to the nonmetallic seal ring 28 so as to preload the latter, and that the seal ring 28 in turn transmits this force to the valve seat body so as to urge the inner end of the seat body toward the valve member and thereby preload the seal ring 27 on its inner end. Thus, this force due to the spring 29 not only supplements that due to line pressure in holding the seat against the valve member, but also, in preloading the seal rings 27 and 28, it insures an initial seal between the seat and the valve member and flowway so line pressure is contained when the valve member is moved to the closed position.

As previously described, the seal ring 27 is preferably formed of Teflon or the like inasmuch as the very low coefficient of friction of this material facilitates sliding of the outer surface of closure 15 against the seal ring during opening and closing of the valve member. Also, when the valve 10 is provided with means for rotating the seat about its axis to distribute wear thereabout, it is also preferred that the seal ring 28 be formed of Teflon or the like so as to facilitate sliding of the outer circumference of the seat body 24 with respect to the flowway. In order to so rotate the seat, the valve member may carry a pair of dogs 33 on each side thereof, as shown in FIG. 1, for engagement with teeth 34 about the inner end of each seat. As disclosed in my copending application, Serial No. 31,867, entitled "Valve," and filed May 26, 1960, these dogs may be so arranged and guided as to rotate each seat a predetermined amount about its axis each time the valve member is rotated between opened and closed positions.

As previously mentioned, seal rings of Teflon are preferably preloaded to above the yield point of this material. For this purpose, the retainer ring 30 may be so located as to prestress the washer type spring at 29 to the degree necessary for imparting this preload to the seal rings 27 and 28.

In the illustrated embodiment of the invention, the seal ring 28 has a substantially triangular shape, with an outer cylindrical surface sealably engageable with the flowway 12 and an inner conical surface 35 for sealably engaging a similarly shaped shoulder 36 on the outer end of the seat body 24. Thus, the force of the spring 29 transmitted through the metallic ring 32 will wedge the seal ring 28 into tight sealing engagement with the triangularly shaped space between the shoulder 36 and the flowway 12. Dirt and other debris within the enlarged cavity 21 of the valve body is kept from the seal ring 28 by means of a barrier 37, which may be a conventional O-ring carried within a groove 38 about the outer circumference of the seat body inwardly of the shoulder 36.

The metallic ring is circular in cross section and, as indicated at 39 in FIGS. 2 and 3, is split about its circumference. Alternately, the ring 32 may be a solid ring. In either case, the ring 32 is of such construction and so arranged relative to the shoulder 36 and flowway 12 that when the seal ring 28 is destroyed, the metallic ring will move inwardly under the influence of spring 29 so as to engage the shoulder 36 and the flowway 12 in the manner shown in FIG. 3. In this position, the metallic ring 32 provides a substantial closure of the annular space between the seat body and flowway. Of course, there will be some fluid leakage through the split 39 between the parts of the seal ring 32. Even though a solid fire seal ring would not have this source of leakage, it would not be as desirable as the split ring in another respect since it would not have the radial adjustability that the split ring has in moving into a seating position between the seat body and the flowway. A precompressed metallic ring of the type used in sealing about pistons would have the advantages of the solid ring as well as the split ring, although it would be more expensive.

In any case, it is important to note that prior to destruction of the seal ring 28, the metallic ring 32 is out of engagement with any part of the seat body 24. Thus, there is no frictional engagement between this ring and the seat body which would impede rotation of the seat body in distributing wear thereabout, at least during normal operation of the valve before destruction of the seal ring 28.

As previously mentioned, and as can be seen from FIG. 3, destruction of the seal ring 27 merely permits the inner end of the seat body 24 to move into engagement with the valve member 13. Thus, the space normally provided between the inner end of the seat body and the valve member due to the protrusion of the seal ring 27 is substantially closed by this interengagement of the seat and valve member. Similarly to the substantial closure provided by metallic ring 32, this is sufficient for the emergency conditions contemplated by the present invention. That is, this "fire seal" is merely for the purpose of preventing excessive leakage through the valve until the seal rings may be replaced. For this same reason, it is relatively unimportant that the O-ring 37 providing the barrier between the seat and flowway is also destroyed.

Although the terms "nonmetallic" and "metallic" have been used to describe the materials from which the rings 27 and 28 and ring 32, respectively, are formed, and the use of such materials is preferred, it will be understood that these rings may be otherwise formed. Thus, the broad objects of the invention may be accomplished by the use of materials, metallic or nonmetallic, as long the material of which rings 27 and 28 are formed will function to seal and the material of which ring 32 is formed will function to provide a "fire seal" in the event seal rings 27 and 28 are destroyed by excessive heat.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A valve, comprising a valve body having a flowway therethrough, a valve member movable within the valve body for opening and closing the flowway, an annular seat axially slidable within the flowway and having an annular groove about its inner end, a first nonmetallic ring protruding from the groove for engaging at its inner end with one side of the valve member, an outwardly facing, conical shoulder about the outer end of the seat and opposite a cylindrical surface of the flowway to form a triangularly shaped recess therebetween a second nonmetallic ring in the recess, a metallic ring disposed on the outer side of the second metallic ring and out of engagement with said seat, said metallic ring being circular in cross-section and separated about its circumference, and spring means urging the metallic ring inwardly against the second nonmetallic ring to urge the second nonmetallic ring into sealing engagement with said shoulder and cylindrical flowway surface and the first nonmetallic ring into sealing engagement with said valve member, each of said valve body, valve member, seat, and spring means being more resistant to destruction than each of the nonmetallic rings, and the inner end of said seat being movable into engagement with the valve member and the metallic ring being movable into engagement with the shoulder on the seat and said cylindrical surface of the flowway, respectively, upon destruction of the nonmetallic rings and continued urging of the spring means, so as to at least substantially close the annular space between the seat and flowway.

References Cited

UNITED STATES PATENTS

| | | | |
|---|---|---|---|
| 2,834,613 | 5/1958 | Snyder | 251—174 X |
| 3,097,823 | 7/1963 | Kaiser | 251—315 X |
| 3,159,414 | 12/1964 | Widman | 285—348 |
| 3,241,808 | 3/1966 | Allen | 251—174 |
| 3,275,025 | 9/1966 | Kowalski | 251—315 |

FOREIGN PATENTS 170,519   10/1921   Great Britain.

M. CARY NELSON, *Primary Examiner.*

H. T. KLINKSIEK, *Assistant Examiner.*